(12) United States Patent
Berry et al.

(10) Patent No.: US 6,381,558 B1
(45) Date of Patent: Apr. 30, 2002

(54) ALTERNATIVE PROFILING METHODOLOGY AND TOOL FOR ANALYZING COMPETITIVE BENCHMARKS

(75) Inventors: Robert Francis Berry; Rangarajan Thiruvenkata Chari; Riaz Yousuf Hussain; Robert John Urguhart, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/213,140

(22) Filed: Dec. 18, 1998

(51) Int. Cl.⁷ .................................................. G06F 11/30
(52) U.S. Cl. ............................. 702/186; 714/38; 717/4
(58) Field of Search ........................... 702/79, 119, 123, 702/176, 179, 181, 182, 183, 185–188; 703/22; 714/38, 39; 717/4

(56) References Cited

U.S. PATENT DOCUMENTS

| | | | | |
|---|---|---|---|---|
| 4,231,106 A | * | 10/1980 | Heap et al. ................. | 702/186 |
| 4,827,427 A | | 5/1989 | Hyduke ........................ | 703/14 |
| 5,303,166 A | * | 4/1994 | Amalfitano et al. ........ | 702/186 |
| 5,452,457 A | * | 9/1995 | Alpert et al. ................. | 717/9 |
| 5,794,011 A | | 8/1998 | Paul et al. .................... | 703/22 |
| 5,892,941 A | * | 4/1999 | Khan et al. .................. | 703/22 |
| 6,088,525 A | * | 7/2000 | Peri ............................... | 717/4 |
| 6,145,121 A | * | 11/2000 | Levy et al. .................... | 717/4 |

* cited by examiner

*Primary Examiner*—Marc S. Hoff
*Assistant Examiner*—Manuel L. Barbee
(74) *Attorney, Agent, or Firm*—Duke W. Yee; Jeffrey S. LaBaw

(57) ABSTRACT

Understanding a third-party vendor's benchmark can be difficult when its source code is proprietary. In particular, the factors on which the benchmark's score depend can not easily be discovered. Furthermore, the sensitivity of the score to the execution speed of various components of the benchmark, which is important for optimizing the score in a competitive environment, is not readily accessible. The present invention shows how insertion of known delays into selected components of a benchmark can be used to elucidate its computational structure, profile it, find the sensitivity of its score to the time spent in a functional component. In all these uses of the present invention, execution of a predetermined amount of code is used to introduce a known delay into a target function or Java method. The benchmark is then re-executed to determine the delay's impact on the benchmark's score. Varying the number of iterations of the delay code, and varying the method or function in which it is inserted, are used to achieve different purposes.

30 Claims, 4 Drawing Sheets

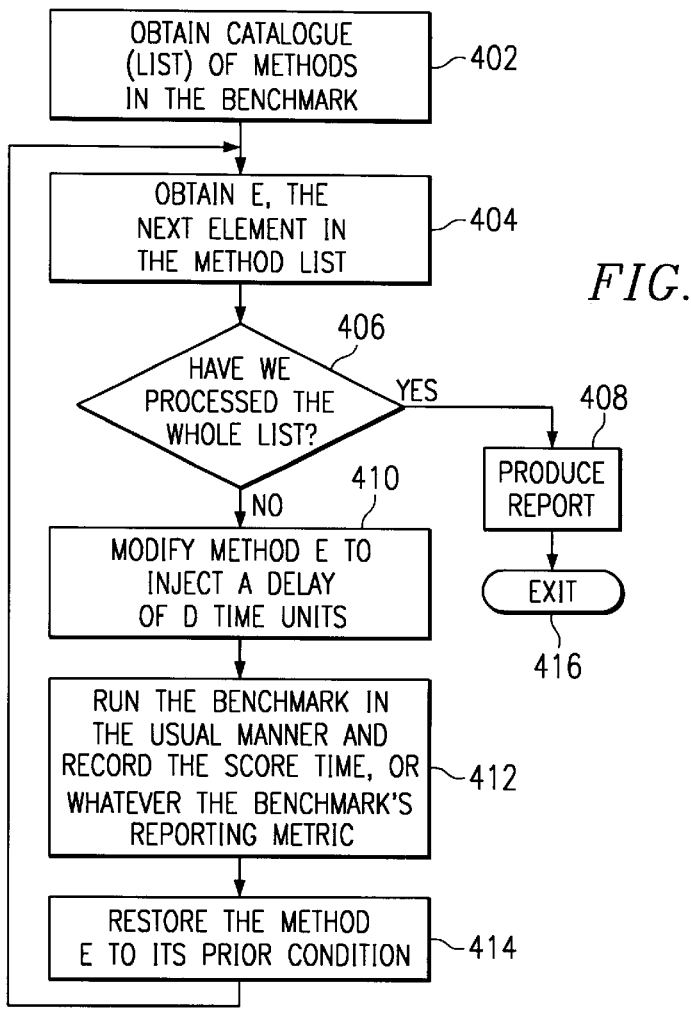
FIG. 4
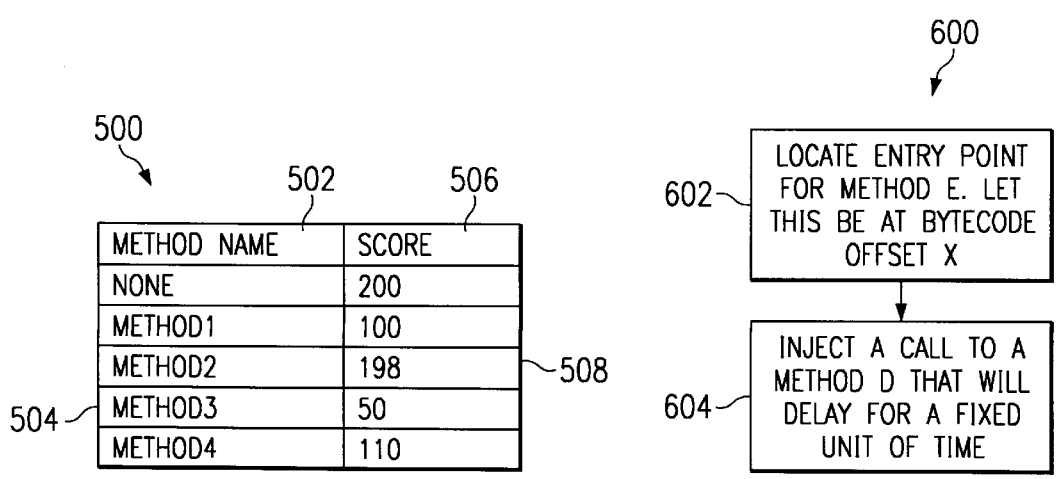
FIG. 5
FIG. 6

```
Class Delay {
    public static int N=1000, size1=20, size2=20;
    public static int i1, i2 = 0;
    public static void one() {
        int i;
        for (int i=0; i<N; i++) {
            int i1=i2=0;
            do {
                i1=(short) (i1+1);
                i2=(short) (i2+1);
            } while (i1<size1 && i2<size2)
        }
    }
    public static void calibrate() {
        int i;
        long begin, end;
        begin = System.currentTimeMillis();
        for (int i=0; i<1000000; i++) {
            int i1=i2=0;
            do {
                i1=(short) (i1+1);
                i2=(short) (i2+1);
            } while (i1<size1 && i2<size2)
        }
        end = System.currentTimeMillis();
        end-=begin;
        System.out.println("1000000 iterations took approximately"
            +Long.toString(end) + " msec.");
    }
}
```

FIG. 7

| method name:method3. Delay injected at method entry. ||
|---|---|
| Delay magnitude | score |
| 0 | 135 |
| 1 | 101 |
| 2 | 86 |
| 5 | 53 |
| 10 | 32 |
| 20 | 19 |
| 30 | 13 |
| 40 | 10 |
| 50 | 8 |
| 100 | 4 |
| 200 | 2 |

FIG. 8

ALTERNATIVE PROFILING METHODOLOGY AND TOOL FOR ANALYZING COMPETITIVE BENCHMARKS

BACKGROUND OF THE INVENTION

1. Technical Field

The present invention relates to both a method and an apparatus for profiling the effectiveness of competitive benchmark tests. Extra delays are placed into the benchmark test to determine the impact on the benchmark's score for the code segment under test.

2. Description of Related Art

Application developers and operating system vendors use benchmark programs to measure the performance of their applications and systems. Benchmark programs are typically written to exercise a specific aspect of the application or system—for example, a file system benchmark might execute a large number of file opens, reads, writes, and closes. With each benchmark program a particular metric of interest is associated; it might be the time it takes for the benchmark to complete (e.g., time to execute 1000 file opens), or be the number of operations that can be completed in a given, fixed time (e.g., number of file opens in 30 seconds). This metric is typically called the score. For the examples above, the first example reports the benchmark score as a response time, while the latter reports the benchmark score as an indicator of throughput. Irrespective of how the score is defined for a particular benchmark, the score is the single indicator typically used to compare one execution of the benchmark with another. In this way, a ranking of a set of application programs (or operating systems) can be readily obtained with respect to a specific benchmark. Most often, benchmark scores are some function of time. However, the mechanism that translates time spent in certain functions, or during certain phases of benchmark execution into the score may not be immediately apparent. Indeed, it may be hidden. Instead of equating benchmark execution time with score, the benchmark program might employ some internal algorithm to determine the score. These algorithms are not generally made available—nor is the source code—so that it becomes a challenge to determine which functions in the benchmark are relevant to the score. It is important for application developers and operating system vendors to understand which parts of the benchmark are relevant, because they are in a competitive position to obtain better scores than competing developers and vendors. Only by tuning the application or system in areas that directly affect the resulting score can these developers and vendors most efficiently deliver competitive implementations.

In these cases, a technique is needed to determine the relevant components of the benchmark. This application describes such a technique that is based on the injection of some specific delay at various identifiable places within the benchmark program and observes the effect that this has on the resulting benchmark score. Once those areas of the benchmark are identified, then we can employ traditional profiling techniques (e.g., program counter sampling techniques) to focus on identifying optimization opportunities for those code segments.

In other cases, the nature of the computation used to arrive at the score itself may not be known. For example, it may not be clear whether the score measures throughput in a fixed amount of time (e.g., the number of operations completed in 60 seconds) or the time required to complete a fixed computation. The invention described herein may be used to help answer these kind of questions.

SUMMARY OF THE INVENTION

The present invention relates to a method and apparatus for methodically altering a benchmark test. A copy of the benchmark is obtained. It is manipulated using binary editing capabilities and a specific unit of additional work (e.g. a unit of delay) is injected into the benchmark. The benchmark proceeds otherwise unchanged and the score is obtained. As mentioned above, many benchmark vendors explicitly report this score and software manufacturers tune their offerings to improve their score. The process is repeated with the unit of delay injected into a different location. Multiple delays can be injected at different locations, or even at the same location to produce a more complete sensitivity map. Following some number of executions, a sensitivity map is developed indicating the impact on the score for a set of injection sites. The resulting map provides an insight into areas of best opportunity for deeper analysis and subsequent improvements.

For example, by repeatedly injecting a unit of delay into each method in a Java application, an indication is obtained on which area of the application are most sensitive to performance. We can then apply more traditional techniques toward the profiling of the underlying middleware/system behavior while the specific activity driven by that method is active.

Furthermore, once the significance of a particular method has been assured, one can further probe the structure of the benchmark by varying the magnitude of delay injected into that method and obtaining the resulting scores. The resulting sensitivity map can provide insight into the role the method plays in score determination, and simultaneously provide a guide to the opportunity for benchmark score improvement.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a flowchart of a method embodying the present invention;

FIG. 5 illustrates a table constructed showing the benchmark score for various methods after the present invention is implemented;

FIG. 6 illustrates a method of modifying the benchmark's code with a delay;

FIG. 7 is an illustration of pseudo code for a class that implements a delay in accordance with a preferred embodiment of the present invention; and FIG. 8 is a table of benchmark scores and delay magnitudes placed in a method in accordance with a preferred embodiment of the present invention.

DETAILED DESCRIPTION OF THE PREFERRED EMBODIMENT

Figure 1:
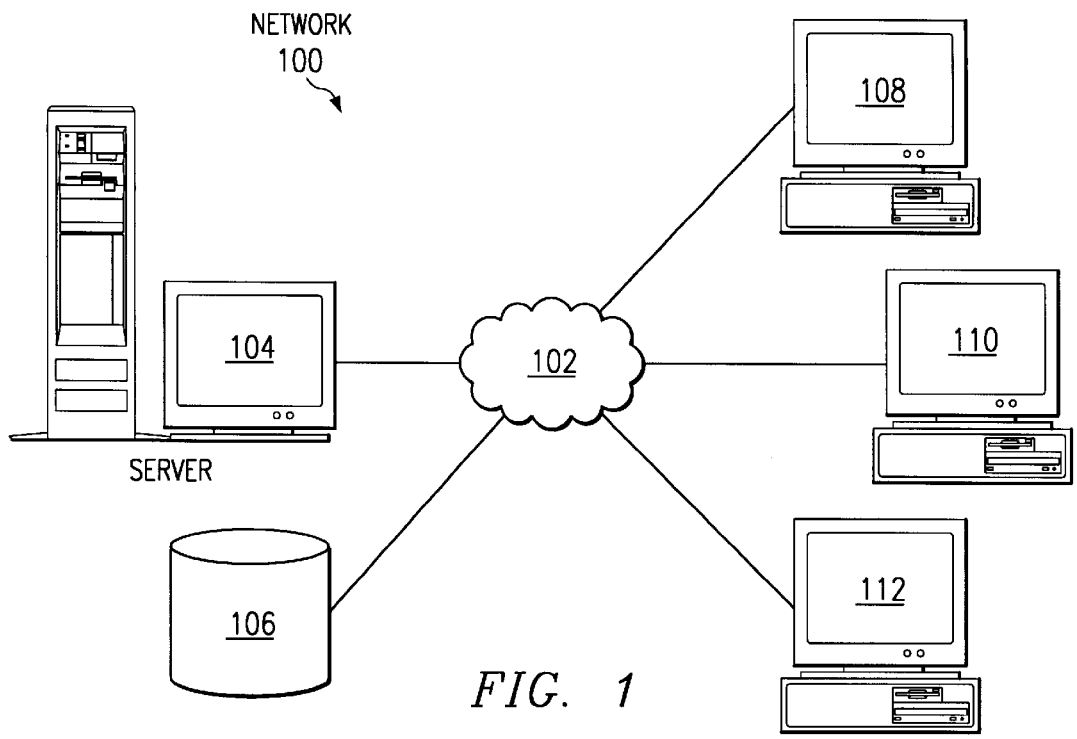
FIG. 1 is a pictorial representation of a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to NCs 108–112. NCs 108, 110, and 112 are clients to server 104. Distributed data processing system 100 may include additional servers, clients, and other devices not shown. FIG. 1 is intended as an example, and not as an architectural limitation for the processes of the present invention.

Figure 2:
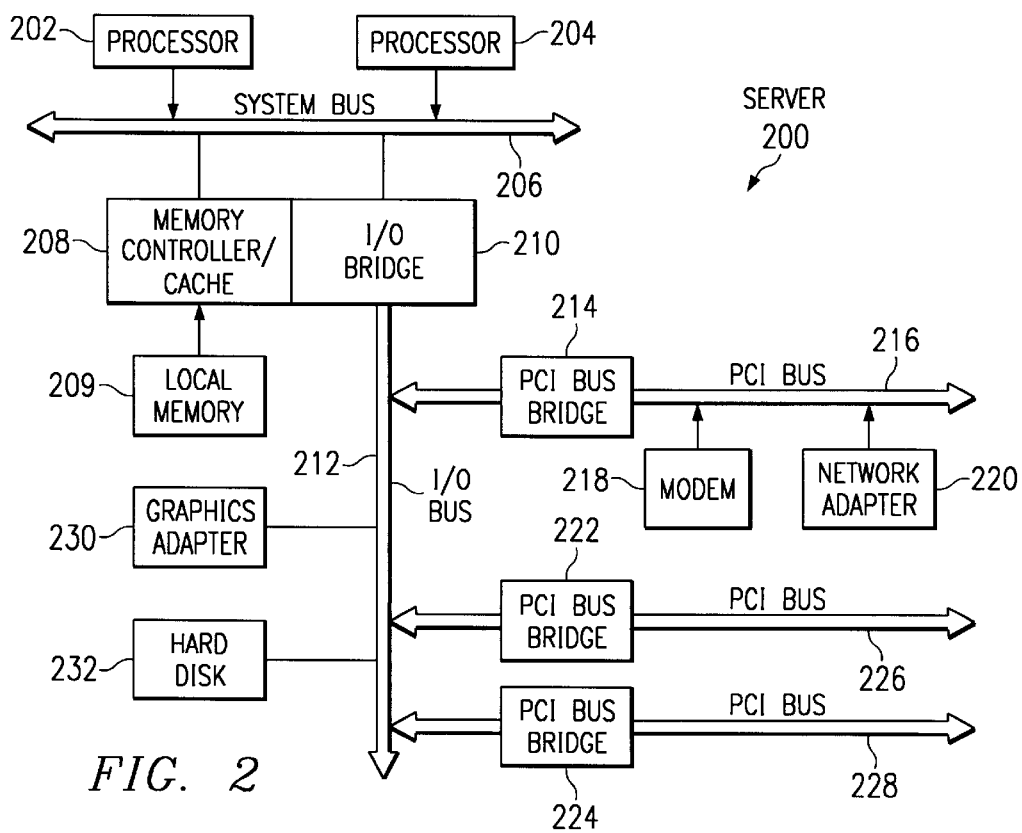
FIG. 2 is a block diagram of a data processing system that may be implemented as a server.

Referring to FIG. 2, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
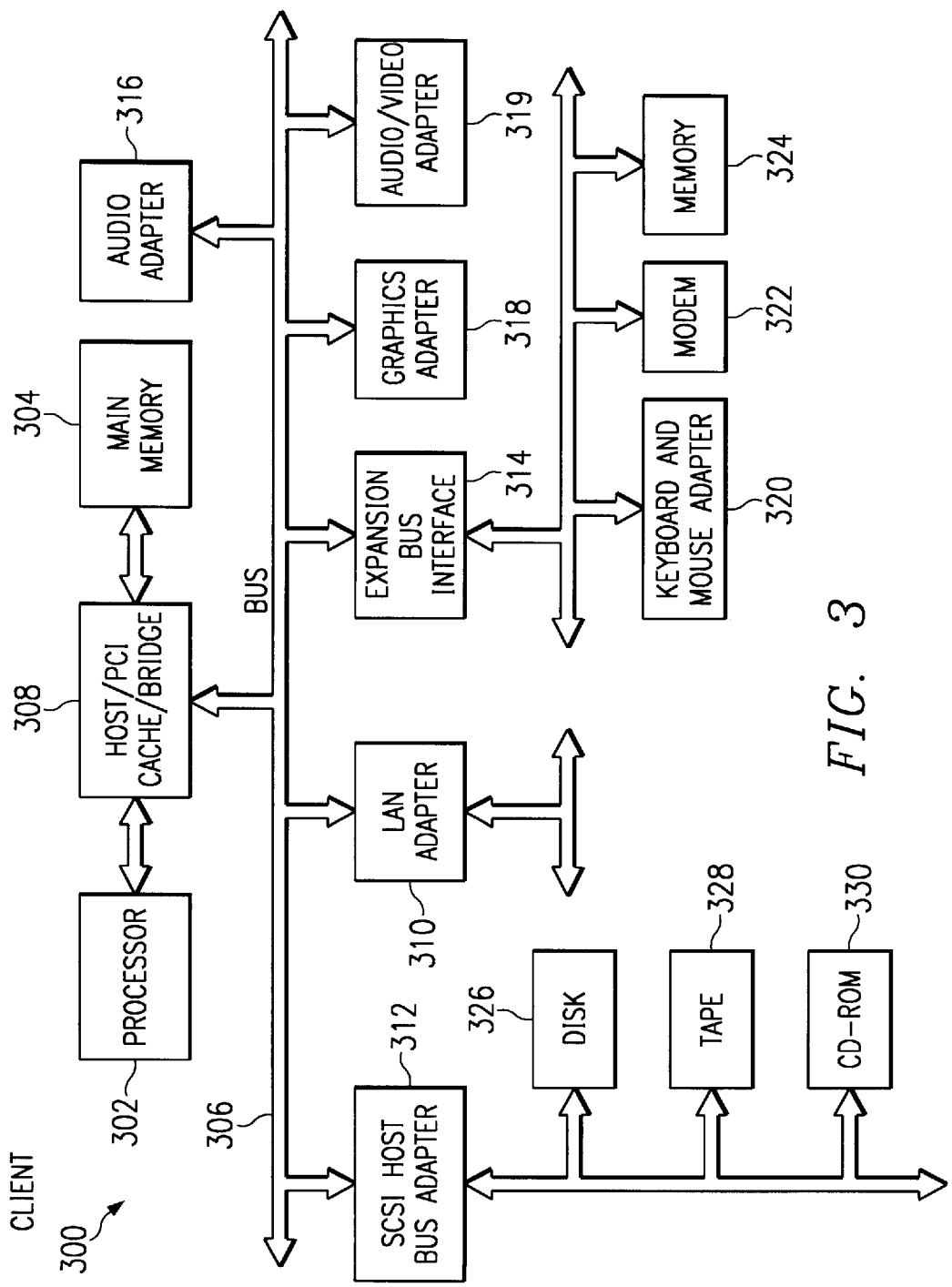
FIG. 3 is a block diagram of a data processing system in which the present invention may be implemented.

With reference now to FIG. 3, a block diagram of a data processing system 300 in which the present invention may be implemented is illustrated. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. Java is a product of Sun Microsystems, Inc. Instructions for the operating system, the object-oriented operating system, and applications or programs are located on storage devices, such as hard disk drive 326 and may be loaded into main memory 304 for execution by processor 302.

Those of ordinary skill in the art will appreciate that the hardware in FIG. 3 may vary depending on the implementation. For example, other peripheral devices, such as optical disk drives and the like may be used in addition to or in place of the hardware depicted in FIG. 3. The depicted example is not meant to imply architectural limitations with respect to the present invention. For example, the processes of the present invention may be applied to multiprocessor data processing system.

FIG. 4 provides a flowchart of a method 400 that implements the present invention. The first step involves obtaining a catalogue or list of processes (or functions) in the benchmark (step 402). For example, a benchmark written in Java consists of a set of class definitions where each class consists of methods (or functions) and data. A Java class file reader could be used to take the Java application (the benchmark) and identify all of the classes and methods that make up this benchmark. Similarly, a custom application that reads Java class files or an application based on the Java Reflection API can be used to identify all of the classes and methods within the benchmark. This provides a list of candidate methods (or functions) that can be subsequently probed with injected delays. Next, the present method obtains E, which represents the next element in the process list (step 404). A decision is then made as to whether the entire method list has been processed (step 406). If so, then a report is produced (step 408) and the process exited (step 416). If not, the method E is modified by injecting a delay of D time units into the method (step 410). The benchmark is then run in the usual manner and a score is recorded (step 412). That score can be a time or any other metric used by the benchmark. The benchmark is then restored to its original state (step 414). The loop then returns to retrieve the next element in the method list (step 404). If there are no more methods to process, the loop ends.

FIG. 5 illustrates a table 500 that can be produced by the report step outlined above. The table can contain two columns, with the first column having a header "method name" 502 and the second column having the header "score" 506. A plurality of entries can be located in each column 504, 508. This report provides the user a sensitivity map. In FIG. 5, a sensitivity map is illustrated in table 500. The benchmark has been determined to consist of 4 methods. First, the benchmark was run without modification ("none") and obtained a score of 200. Next, a fixed delay was injected into method1 and obtained a score of 100; the delay was then removed from method1 and injected into method2, resulting in a score of 198. It can be seen that of all 4 methods, method3 is the one for which a unit delay resulted in the most significant impact on score. Indeed, delaying method2 appeared to have no material affect on the score at all. In the depicted example, the next analysis step would probably be to look at speeding up method3.

FIG. 6 is a flowchart 600 showing the steps by which a delay can be injected into the benchmark. First, an entry point must be located for the method E (step 602). In practice, this can be at bytecode offset X. Java methods are expressed as sequences of Java bytecodes. Java bytecodes are the output of the Java compiler (the JDK's "javac" command). In general computing terminology, the output of a compiler is called "object code." Thus, Java bytecodes are object code produced by a Java compiler. They are sequences of instructions in the language of the Java Virtual Machine. When one compiles a java program, e.g. hello.java, it produces a class file, hello.class. That class file contains all of the information required by the Java runtime environment to execute that program. This information includes bytecodes for all of the methods in that class. So, when a delay is injected into method E, the bytecodes are modified in method E at a particular offset (say, offset 0 to delay the method at the immediate entry point). Next, a call is injected into the method E of delay D (step 604). The call can be to a method in a class that implements a specific delay of some well-known amount of time. Such delays can be implemented in many different ways. For large delay times, system timers can be used (e.g., Java provides a sleep function called Thread.sleep(x), where x indicates the number of milliseconds to sleep). Unfortunately, the granularity of such delay mechanism is frequently too coarse and injecting a delay in the millisecond range could cause the resulting modified benchmark to fail completely. A better solution is to implement a class with a delay method that consumes a well-defined amount of CPU time before returning. Such a class is illustrated in FIG. 7.

The calibrate() method shown in FIG. 7 is used to determine how long 1000000 iterations of the delay loop take. The one() method delays for 1000 iterations of the same loop. The constants can be changed for any particular application of this invention to obtain an appropriately small delay value. In general, delays on the order of less than a microsecond are most appropriate—but specific values depend on the benchmark. Note that the exact magnitude of the delay or knowledge thereof is not as important as the deterministic, non-random nature of the delay introduced. The relative effect on the score of the injection of the same amount of delay in different parts of the benchmark, tells us the relative sensitivity of the score to the execution speed of those parts of the benchmark. Experiments involving variation of the delay magnitude also do not depend crucially on knowledge of the magnitudes—they are typically performed by insertion of an integral number of delays of some constant magnitude. The foregoing has illustrated the use of the technique to obtain a sensitivity map of a benchmark/application with respect to a fixed delay. The result is a table such as shown in FIG. 5.

The foregoing has illustrated the use of this technique to discern the portion of a benchmark (e.g., the method) whose execution time has the most impact on the score. There are several important variations. First, note that injecting the delay at the beginning of a method provides insight into only whether or not the beginning of that particular method is important in the score determination. It provides no insight into the internal structure of the method (e.g., if the method contains loops). Using the same techniques described above it is possible to inject delays at arbitrary byte offsets within the method. The result is a more detailed address space versus score sensitivity map that provides even greater insight into where tuning opportunities may lie.

Besides the order of importance of methods to a benchmark score, there are other interesting questions which this invention can help answer. For example, suppose a benchmark always completes in a fixed amount of elapsed time (e.g., 60 seconds).

Consider two, of many, possible models for the benchmark: the first consisting of N phases of execution, each phase running for a certain fixed amount of time. All phases may not execute for the same amount of time, but the total execution time of all the phases is constant, e.g., 60 seconds. The second model we consider for this example is one in which there is a single fixed computation, which is run over and over again for a fixed duration (e.g., 60 seconds). The two models involve execution of the same set of methods.

The present invention allows us to distinguish between the two models as follows: If the first model is true of our benchmark, then injecting more and more delay in a method (that is not invoked in more than one phase) will lower the score to some nonzero level, but no further. On the other hand, if the second model fits the benchmark, injecting more and more delay will ultimately reduce the score to zero. For example, consider the table in FIG. 8 obtained from using this invention on a Java benchmark. In FIG. 8, method3 was identified as being relevant to the score (using the technique described earlier). Then, by injecting increasingly-larger delays and rerunning the benchmark, the data in the table may be developed. For this example, the score appears to be driven to 0 as the delay is increased in magnitude. In a further illustration of this example and this invention, we make the following observation that for a small delay (e.g., 1) the score is significantly impacted (from 135 to 101). A reasonable conjecture is that for small changes in delay, a corresponding improvement may be inferred in score if the delay were negative. In other words, it is assumed that the function governing the relationship between the magnitude of injected delay and resulting score is linear for small changes in delay. Then, we can use this invention to estimate the magnitude of speedup required in a particular method in order to achieve a certain improvement in the benchmark score, all other methods being unchanged, or, equivalently, to estimate the increase in score to be expected from a given speedup of a particular method.

As a result, several important results may be concluded from this use of the invention for the present example:

a. method3 is important to the benchmark score, b. the benchmark is closer in structure to model 2 than model 1, and c. if the Java virtual machine is optimized to reduce the execution time for method3 by one unit of time, a significant improvement in overall score may be predicted. While imprecise, this provides a means to rank the methods for which such optimizations should be considered—thus improving analysis efficiency.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A method of analyzing performance of object code using a benchmark, comprising the steps of:

(a) measuring the performance of the object code with the benchmark to determine a level of performance;

(b) injecting a known difference into the benchmark at a known location;

(c) re-measuring the performance of the object code with the altered benchmark.

2. The method of claim 1 wherein step (b) comprises locating an entry point for the benchmark.

3. The method of claim 2 further comprises locating an entry point for a method of the benchmark.

4. A method of analyzing performance of object code using a benchmark, comprising the steps of:

(a) measuring the performance of the object code with the benchmark to determine a level of performance;

(b) injecting a known difference into the benchmark at a known location;

(c) re-measuring the performance of the object code with the altered benchmark, wherein said known difference is a known delay.

5. A method of analyzing performance of object code using a benchmark, comprising the steps of:

(a) measuring the performance of the object code with the benchmark to determine a level of performance;

(b) injecting a known difference into the benchmark at a known location;

(c) re-measuring the performance of the object code with the altered benchmark;

wherein steps (b) and (c) are repeated with the known difference located at other locations within the benchmark.

6. A method of analyzing performance of object code using a benchmark, comprising the steps of:

(a) measuring the performance of the object code with the benchmark to determine a level of performance;

(b) injecting a known difference into the benchmark at a known location;

(c) re-measuring the performance of the object code with the altered benchmark, wherein step (b) comprises obtaining a method list in the benchmark.

7. The method of claim 6 further comprises obtaining the next element in the method list.

8. The method of claim 7 further comprises processing the method list.

9. The method of claim 8 further comprises producing a report of at least one score based on the measured and re-measured performances.

10. A method of analyzing performance of object code using a benchmark, comprising the steps of:

(a) measuring the performance of the object code with the benchmark to determine a level of performance;

(b) injecting a known difference into the benchmark at a known location;

(c) re-measuring the performance of the object code with the altered benchmark;

(d) restoring the altered benchmark to an original condition.

11. A method of analyzing performance of object code using a benchmark, comprising the steps of:

(a) measuring the performance of the object code with the benchmark to determine a level of performance;

(b) injecting a known difference into the benchmark at a known location;

(c) re-measuring the performance of the object code with the altered benchmark;

(d) locating an entry point at a bytecode offset X.

12. A data processing system for analyzing the performance of object code using a benchmark, the data processing system comprising:

(a) means for measuring the performance of the object code with the benchmark to determine a level of performance;

(b) means for injecting a known difference into the benchmark at a known location;

(c) means for re-measuring the performance of the object code with the altered benchmark.

13. A data processing system for analyzing the performance of object code using a benchmark, the data processing system comprising:

(a) means for measuring the performance of the object code with the benchmark to determine a level of performance;

(b) means for injecting a known difference into the benchmark at a known location;

(c) means for re-measuring the performance of the object code with the altered benchmark, wherein said known difference is a known delay.

14. A data processing system for analyzing the performance of object code using a benchmark, the data processing system comprising:

(a) means for measuring the performance of the object code with the benchmark to determine a level of performance;

(b) means for injecting a known difference into the benchmark at a known location;

(c) means for re-measuring the performance of the object code with the altered benchmark;
wherein steps (b) and (c) are repeated with the known difference located at other locations within the benchmark.

15. A data processing system for analyzing the performance of object code using a benchmark, the data processing system comprising:
   (a) means for measuring the performance of the object code with the benchmark to determine a level of performance;
   (b) means for injecting a known difference into the benchmark at a known location;
   (c) means for re-measuring the performance of the object code with the altered benchmark,
   wherein (b) comprises means for obtaining a method list in the benchmark.

16. A data processing system for analyzing the performance of object code using a benchmark, the data processing system comprising:
   (a) means for measuring the performance of the object code with the benchmark to determine a level of performance;
   (b) means for injecting a known difference into the benchmark at a known location;
   (c) means for re-measuring the performance of the object code with the altered benchmark;
   (d) means for producing a report of at least one score based on the measured and re-measured performances.

17. A data processing system for analyzing the performance of object code using a benchmark, the data processing system comprising:
   (a) means for measuring the performance of the object code with the benchmark to determine a level of performance;
   (b) means for injecting a known difference into the benchmark at a known location;
   (c) means for re-measuring the performance of the object code with the altered benchmark;
   (d) means for restoring the altered benchmark to an original condition.

18. A computer program product for executing a method in a data processing system, comprising:
   (a) first instructions measuring the performance of object code with the benchmark to determine a level of performance;
   (b) second instructions for injecting a known difference into the benchmark at a known location;
   (c) third instruction for re-measuring the performance of the object code with the altered benchmark.

19. A computer program product for executing a method in a data processing system, comprising:
   (a) first instructions measuring the performance of object code with the benchmark to determine a level of performance;
   (b) second instructions for injecting a known difference into the benchmark at a known location;
   (c) third instruction for re-measuring the performance of the object code with the altered benchmark;
   wherein said known difference is a known delay.

20. A computer program product for executing a method in a data processing system, comprising:
   (a) first instructions measuring the performance of object code with the benchmark to determine a level of performance;
   (b) second instructions for injecting a known difference into the benchmark at a known location;
   (c) third instruction for re-measuring the performance of the object code with the altered benchmark; and
   (d) fourth instructions for repeating (b) and (c) with the known difference located at other locations within the benchmark.

21. A method in a data processing system for analyzing a object code having a level of performance, the method comprising the data processing system implemented steps of:
   introducing a unit of delay into a known location in a function within a plurality of functions in the object code; and
   measuring performance of the object code containing the unit of delay.

22. The method of claim 21, further comprising:
   repeating the steps of introducing and measuring for a plurality of different locations within the object code.

23. The method of claim 22, wherein measurements of performance of the object code for the plurality of different locations within the object code are used to discern a structure for the object code.

24. The method of claim 22 further comprising:
   mapping performance levels to identify a location within the object code that is most sensitive to the unit of delay.

25. The method of claim 21, wherein the object code includes a plurality of functions.

26. The method of claim 21, wherein the object code is for a benchmark program.

27. The method of claim 21, wherein the object code includes a plurality of methods.

28. The method of claim 27, wherein the known location is within a method within the plurality of methods and further comprising:
   introducing the unit of delay into other locations within the method;
   measuring performance of the object code containing the unit of delay each of the other locations within the method; and
   identifying an ability to speed up the method through tuning using the measured performance of the object code with the unit of delay at the location and at the other locations within the method.

29. The method of claim 21, wherein the unit of delay has a magnitude and further comprising:
   changing the magnitude of the unit of delay; and
   measuring the performance of the object code containing the unit of delay with the changed magnitude.

30. The method of claim 29, wherein sensitivity of the object code to changes in the magnitude of the unit of delay may be identified.

* * * * *